United States Patent [19]

Koeller

[11] 4,142,826
[45] Mar. 6, 1979

[54] DRAFT TUBE AERATION WITH CHECK VALVES

[75] Inventor: Paul Koeller, Dorval, Canada

[73] Assignee: Dominion Engineering Works Limited, Lachine, Canada

[21] Appl. No.: 845,544

[22] Filed: Oct. 26, 1977

[30] Foreign Application Priority Data

Nov. 26, 1976 [CA] Canada .................................. 266670

[51] Int. Cl.² ............................................. F01D 25/30
[52] U.S. Cl. .................................... 415/116; 60/696; 415/119
[58] Field of Search ............... 415/116, 117, 119, 500; 60/686, 689, 696

[56] References Cited

U.S. PATENT DOCUMENTS

| | | | |
|---|---|---|---|
| 1,606,887 | 11/1926 | Moody | 415/117 |
| 2,262,191 | 11/1941 | Moody | 415/116 |
| 2,300,748 | 11/1942 | Rheingans | 60/689 |

Primary Examiner—Louis J. Casaregola
Attorney, Agent, or Firm—R. A. Eckersley

[57] ABSTRACT

A hydraulic turbo-machine such as a Francis turbine has a draft tube with air admission provision, to stabilize flow. A plurality of air boxes are provided having a long upstream surface and a short downstream surface to provide an inductive effect with the flow of water downwardly thereover. A non-return valve at the box downstream face substantially precludes the ingress of water within the box during conditions of disturbed flow, so that the breathing capability of the box is optimized.

6 Claims, 4 Drawing Figures

DRAFT TUBE AERATION WITH CHECK VALVES

This invention is directed to a turbo-hydraulic machine, and in particular to the provision of draft tube aeration means.

The smooth functioning of turbo machines such as Francis turbines can be facilitated and made smoother and more reliable, particularly when working at part-load, off the optimum design point, by the provision of aeration to the draft tube so as to introduce air in sufficient quantities to stabilize the flow of the working liquid.

Prior art devices and provisions for this purpose have been many, including one draft tube arrangement having air admission from a pressurized source through a plurality of down-turned elbows extending within the draft tube. This arrangement has been found to have certain undesired characteristics, which the present invention overcomes, at least partially.

The present invention provides an aeration arrangement for use within the draft tube of a turbo-hydraulic machine, having a plurality of air flow boxes located within the draft tube in overlying relation with respective air supplies, each box having an inclined downstream surface extending in a direction to produce substantially cavitation-free flow of working fluid, and including a check valve arrangement to substantially preclude the ingress of working liquid into the box. This has the advantage that upon the occurrence of a turbulence-promoting rope of water and upon swirling in the draft tube, the quantity of water entering the air box is limited to being almost negligible, so that the air box is virtually unimpeded from performing its air supply function.

Certain embodiments of the invention are described, reference being made to the accompanying drawings, wherein.

Figure 1:
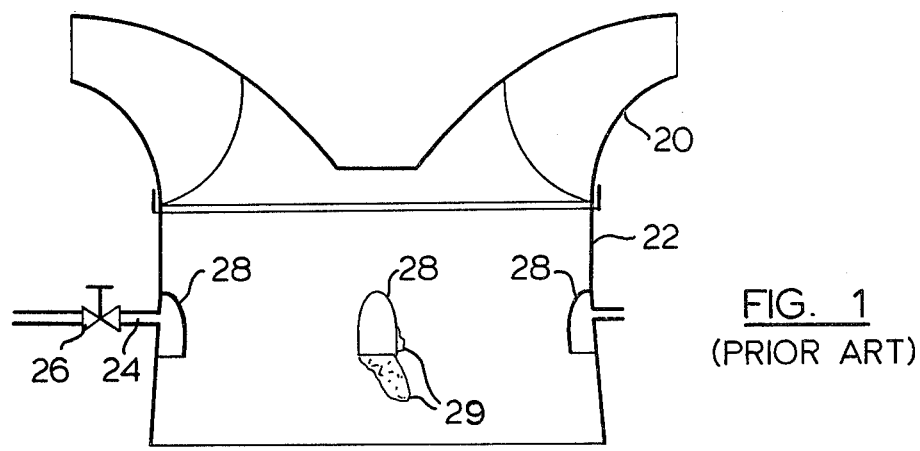
FIG. 1 is a schematic representation of a diametrical elevation of a Francis turbine aeration arrangement according to the prior art.

The prior art embodiment schematically illustrated in FIG. 1 shows a Francis type turbine having a runner 20 rotatably mounted above a draft tube 22. An air supply pipe 24 connects by way of throttle valve 26 to a plurality of supply elbows 28 extending within the draft tube 22. A typical zone 29 of cavitation damage is illustrated.

Figure 3:
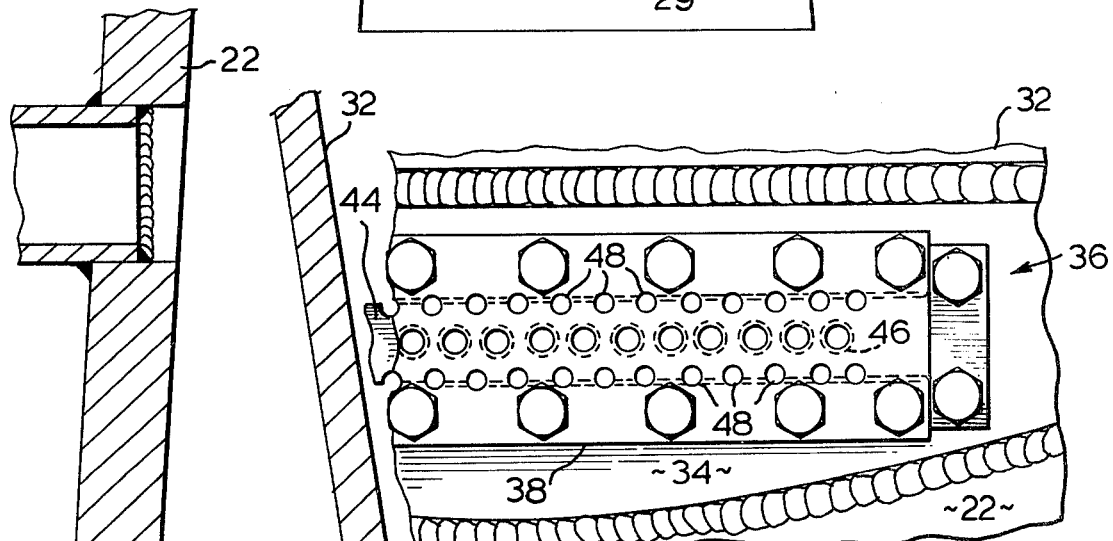
FIG. 3 is an end view taken from below the FIG. 2 embodiment.
Figure 2:
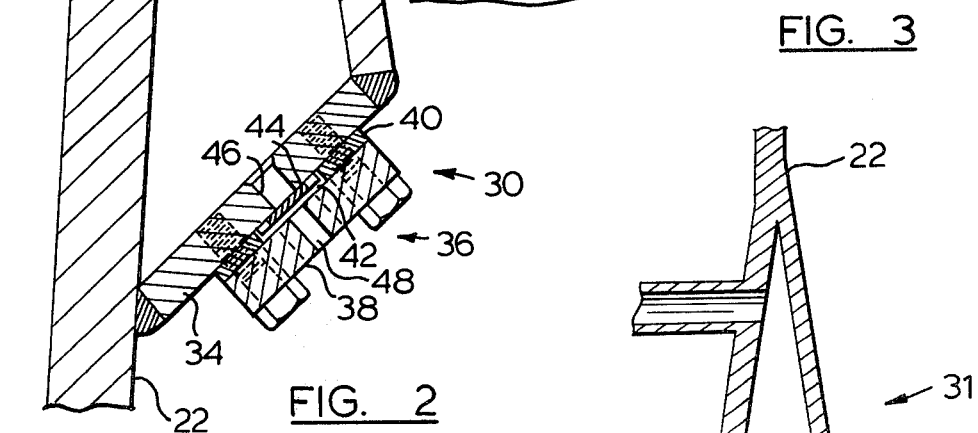
FIG. 2 is an elevational section of a draft tube wall incorporating a first embodiment of the present invention.

In FIGS. 2 and 3 an air box 30, being one of a plurality of like air boxes located within the draft tube 22, has an upstream plate 32 and a downstream plate 34 suitably proportioned to provide an air box of slender profile so as to minimize the likelihood of cavitation.

The downstream face 34 is inclined at an angle in the order of about 40° to 60°, being sufficient to create low pressure flow conditions under normal operation so that air can flow readily from the box 30 to the draft tube 22.

It is possible to select the proportions and angles of plates 32, 34 such that an eductive effect is achieved, and air is drawn out from the air box 30 into the draft tube 22.

The valve arrangement 36 comprises a keeper plate 38 having a series of air passages therethrough, a spacer plate 40 having an elongated recess 42 extending through the thickness of the plate and for the major portion of its length. A movable valve member 44 of rectangular form fits loosely within the recess 42, in interposed relation between the air passages of plate 38 and a series of centrally located apertures 46 extending through the plate 34.

Under normal conditions the rectangular valve member 44 lies in its recess 42 and in supported relation against keeper plate 38. This leaves clear access from the air outlet apertures 46, around the member 44 and outwardly through the apertures 48 in keeper plate 38.

The valve member 44 is held centred in relation to the recess 42 by a plurality of transversely extending lobes or ears, shown unsectioned, which slidably engage the walls of the recess 42.

In operation the valve member 44 when displaced upwardly maintains the air box 30 substantially clear of water, while in the normal downward position permits free breathing from the air box 30 to the draft tube 22.

Figure 4:
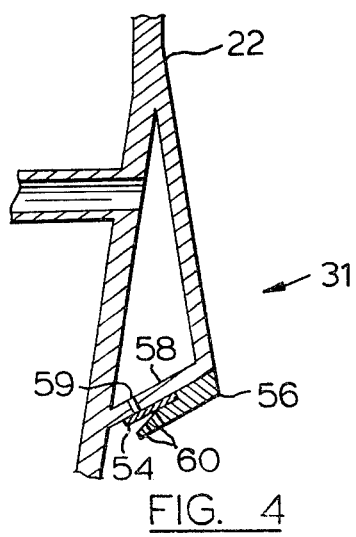
FIG. 4 is a view similar to FIG. 2 but to a smaller scale, of a second embodiment.

Referring to FIG. 4, a flexible valve plate 54 is resiliently biased against the bottom plate 58 of air box 31. A keeper plate 56 secures one edge of the plate 54 in hinged relation therewith. A plurality of holes 60 in the keeper plate 56 permit the application of counter flowing or swirl water against the outer face of valve plate 54, to move it upward into sealing relation with the outer face of the plate 58, to seal off the air outlet holes 59 against upward ingress of water into the air box 31.

The FIG. 4 embodiment has the functional and structural attractions of simplicity, dependability and ready repairability.

This embodiment is well suited to use as an annular air box extending about the full inner periphery of the draft tube 22.

What I claim as new and desire to secure by Letters Patent of the United States is:

1. A turbo-hydraulic machine having a casing, a runner rotatably mounted within the casing, a draft tube positioned to receive working liquid on passage thereof through said runner, air box means within said draft tube at the inner wall surface thereof having a slender profile and slender aspect ratio to create minimal disturbance to the flow of liquid in the tube, including a downstream face inclined to provide separation of liquid therefrom, having air outlet apertures therein, and valve means located adjacent said air outlet apertures to permit the outflow of air therepast, being responsive to the directions of liquid flow, to impede the ingress of said working liquid within said box.

2. The machine as claimed in claim 1 having said valve means located externally of said downstream face, and valve securing means located externally of the box in at least partial overlying protective relation relative to said valve means.

3. A turbo-hydraulic machine having a casing, a runner rotatably mounted within the casing, a draft tube conveying liquid in the machine having a plurality of air boxes in spaced relation about the inner surface of the draft tube each having an elongated upstream surface and a shorter downstream surface, each subtending an acute angle with said draft tube within the box, valve means including a resilient closure member secured to an outer portion of said downstream surface in pressure responsive relation to permit the outflow of air under a first water flow condition, and to preclude the inflow of water under a second water flow condition.

4. The machine as claimed in claim 3 said valve means including a support member located downstream of said closure member to support the closure member when in a flexed state permitting outflow of air from said air box means, said support member having apertures therethrough to direct transversely impinging water against said closure member, to move said closure member into sealing relation with said air box means to preclude the upward ingress of water into the air box means.

5. The machine as claimed in claim 1 having a plurality of said boxes, each having an elongated upstream surface and a shorter downstream surface, each subtending an acute angle with said draft tube within the box, said valve means including a resilient closure member secured to an outer portion of said downstream surface in pressure responsive relation to permit the outflow of air under a first water flow condition, and to preclude the inflow of water under a second water flow condition.

6. The machine as claimed in claim 1, said valve means including a resilient closure member secured to an outerportion of said downstream surface, and a support member located downstream of said closure member to support the closure member when in a flexed state permitting outflow of air from said air box means, said support member having apertures therethrough to direct ransversely impinging water against said closure member, to move said closure member into sealing relation with said air box means to preclude the upward ingress of water into the air box means.

* * * * *